United States Patent [19]

Gallagher

[11] 4,155,834
[45] May 22, 1979

[54] CATALYTIC REFORMING METHOD FOR PRODUCTION OF BENZENE AND TOLUENE

[75] Inventor: James P. Gallagher, Park Forest, Ill.

[73] Assignee: Atlantic Richfield Company, Philadelphia, Pa.

[21] Appl. No.: 828,701

[22] Filed: Aug. 29, 1977

Related U.S. Application Data

[63] Continuation-in-part of Ser. No. 643,272, Dec. 22, 1975, abandoned.

[51] Int. Cl.$^2$ .................. C10G 35/08; C10G 39/00
[52] U.S. Cl. .................................. 208/65; 208/138; 208/139
[58] Field of Search ..................... 208/65, 138, 139

[56] References Cited

U.S. PATENT DOCUMENTS

| | | | |
|---|---|---|---|
| 3,070,637 | 12/1962 | Honeycutt | 208/65 |
| 3,234,120 | 2/1966 | Capsuto | 208/138 |
| 3,474,026 | 10/1969 | Derr, Jr. et al. | 208/138 |
| 3,577,474 | 5/1971 | Jacobson | 208/138 |
| 3,617,522 | 11/1971 | Schrepfer | 208/138 |
| 3,660,271 | 5/1972 | Keith et al. | 208/138 |
| 4,049,539 | 9/1977 | Yan et al. | 208/65 |

Primary Examiner—O. R. Vertiz
Assistant Examiner—Wayne A. Langel
Attorney, Agent, or Firm—Frank J. Uxa; Stanley M. Welsh

[57] ABSTRACT

An improved hydrocarbon reforming process involves contacting hydrocarbon feed comprising benzene and toluene precursors in at least two reaction zones which include a platinum group metal-containing catalyst. Improved yields of benzene are obtained provided that the inlet temperature of each succeeding reaction zone is increased relative to the inlet temperature of the immediately preceding reaction zone. Also, improved benzene yields are obtained by providing a limited water concentration in at least one of the reaction zones. Further, improved toluene yields are obtained by operating at least one of the reaction zones at substantially anhydrous conditions.

12 Claims, No Drawings

CATALYTIC REFORMING METHOD FOR PRODUCTION OF BENZENE AND TOLUENE

This application is a continuation-in-part of application Ser. No. 643,272 filed Dec. 22, 1975, now abandoned.

This invention relates to improved methods of producing an aromatic hydrogen product or products. More particularly, the invention relates to improved methods of producing a benzene product, a toluene product or both which involves catalytic hydrocarbon reforming.

Catalytic reforming of hydrocarbon feeds comprising benzene precursors and toluene precursors has previously been used to produce benzene product and toluene product, respectively. In such conventional processing schemes, the benzene and/or toluene can be separated from the remainder of the liquid reformate using well known techniques such as solvent extraction, extractive distillation, combinations of both and the like. Since the demand for benzene and toluene continues to increase, it would be advantageous to employ methods producing improved yields of benzene product and toluene product.

Therefore, one primary object of the present invention is to provide an improved method for producing a benzene product.

Another object of the present invention is to provide an improved method for producing a toluene product. Other objects and advantage of the present invention will become apparent hereinafter.

An improved method for producing a benzene product, a toluene product or both which involves catalytically reforming a hydrocarbon feed comprising benzene precursors, toluene precursors or both in the presence of hydrogen and a platinum group metal-containing catalyst has been found. The liquid product from the reforming is conventionally separated, e.g., solvent extraction, extractive distillation, combinations of solvent extraction and extractive distillation, and simple distillation and the like, to form a benzene product, a toluene product or both. The remainder of the reformate, e.g., paraffins, other aromatic hydrocarbons and the like, may be used, for example, as gasoline components or as feedstocks to other processing operations.

In one aspect, the present invention involves contacting a hydrocarbon feed which comprises benzene precursors with a platinum group metal-containing catalyst in a first reaction zone maintained under hydrocarbon reforming conditions in the presence of free molecular hydrogen to form a first hydrocarbon effluent. At least a portion of this first hydrocarbon effluent is contacted with a platinum group metal-containing catalyst in at least one subsequent reaction zone maintained under reforming conditions in the presence of hydrogen. By providing that the inlet temperature of each succeeding reaction zone is increased relative to the inlet temperature of the immediately preceeding reaction zone, an improved yield, e.g., absolute production, of benzene is obtained relative to, for example, such yield in a reforming operation in which the inlet temperatures of each of the reaction zones are substantially equal. Also, in this aspect of the present invention, it is essential that the inlet temperature of the last reaction zone be sufficiently elevated so that the overall yield of liquid, i.e., $C_5+$, product from the reforming operation is substantially equal to, i.e., within about 1.5% by volume, or, preferably, less than the yield of liquid product from a reforming operation in which the inlet temperatures of each of the reaction zones is substantially equal. Preferably, the inlet temperature of the first reaction zone is from about 25° F. to about 100° F. less than the outlet temperature of the last reaction zone. Thus, the present method provides for improved yields of benzene product.

Preferably, in the embodiment described above, the hydrocarbon feed comprising benzene precursors enters the first reaction zone at a temperature of at least about 780° F., more preferably in the range from about 800° F. to about 920° F. Also, the hydrocarbon material entering the last reaction zone is preferably at a temperature, i.e., inlet temperature of the last reaction zone, of at least about 900° F., more preferably within the range from about 900° F. to about 1000° F. The difference in inlet temperatures between any two consecutive reaction zones is preferably at least about 10° F. and, more preferably, in the range from about 10° F. to about 100° F. As is conventional in hydrocarbon reforming, the hydrocarbon-hydrogen mixture may be passed through conventional heat transfer equipment, i.e., direct fired heaters, prior to entering each of the reaction zones. By controlling the amount of heat transferred to the hydrocarbon-hydrogen mixtures entering each of the reaction zones, the inlet temperatures of these reaction zones can be maintained according to the present invention.

Gases containing hydrogen and usually some lower boiling hydrocarbons, e.g., $C_4$ and lower, may be separated from the hydrocarbon effluent from the last reaction zone and are often at least partially recycled to one or more of the reaction zones.

In an additional aspect of the present invention, an improved method for producing a benzene product which involves catalytically reforming a hydrocarbon feed comprising a material selected from the group consisting of methyl cyclopentane and mixtures of methyl cyclopentane and other benzene precursors in the presence of hydrogen and a platinum group metal-containing catalyst has been found. This catalytic reforming takes place in at least one reaction zone, preferably in a plurality of separate reaction zones employed in series. It has now been determined that the yield of benzene product can be improved by maintaining a water partial pressure in at least one, preferably all, of such reaction zones of at least about 0.02 mm. Hg., relative to the yield of benzene product obtained employing a substantially anhydrous reaction environment, i.e., water concentration of less than 0.02 mm.Hg. water partial pressure in the reaction zone.

While it has been found that a water vapor concentration, expressed as partial pressure, of at least 0.02 mm.Hg. gives beneficial results relative to a substantially anhydrous reaction environment, it is preferred that the water vapor concentration in the reaction zone be at least about 0.10 mm.Hg., and more preferably at least about 0.40 mm.Hg., in order to receive the full and maximum benefits of the present invention. Of course, the water vapor concentration within the reaction zones is limited on the upper end of the scale for the reasons of catalyst stability. For example, high water vapor concentrations during processing tend to cause sintering of the catalyst, i.e., destruction of the porous character of the support, e.g., alumina, leading to reductions in the surface area and activity of the catalyst. An additional detriment to operating with high water vapor concentrations is the fact that the water may cause the removal of the halogen component, if any, from the catalyst. This latter problem can be alleviated by adding halogen to the charge hydrocarbon, if desired, to insure a constant catalyst halogen level. In order to avoid the above-noted problems, it is preferred that the water vapor partial pressure in the reaction zone be less than about 3 mm.Hg., more preferably less than about 1.5 mm.Hg. Therefore, the preferred reaction zone water concentration expressed as partial pressure is from about 0.10 mm.Hg. to about 3 mm.Hg., more preferably from about 0.4 mm.Hg. to about 1.5 mm.Hg.

In a still further aspect of the present invention, an improved method for producing a toluene product which involves catalytically reforming a hydrocarbon feed comprising a material selected from the group consisting of dimethyl cyclopentane and mixtures of dimethyl cyclopentane and other toluene precursors in the presence of hydrogen and a platinum group metal-containing catalyst in at least one reaction zone, preferably a plurality of separate reaction zones employed in a series, has been found. By maintaining the water vapor concentration in at least one, preferably all, of such reaction zones below about 0.1 mm.Hg., preferably below about 0.02 mm.Hg., an improved yield, i.e., absolute production, of toluene product is obtained relative to the toluene yield obtained at reaction zone water vapor partial pressure of 0.2 mm.Hg. or higher.

Typical reforming conditions include pressures in the range from about 50 psig. to about 1000 psig., preferably from about 100 psig. to about 600 psig.; hydrogen to hydrocarbon mole ratios (entering the reaction zone) in the range from about 2 to about 30, preferably from about 4 to about 20; and WHSV, i.e., weight of hydrocarbon per unit time per unit weight of catalyst, in each reaction zone, in the range from about 1 to about 200 or more, preferably from about 1 to about 100. Overall WHSV, i.e., weight of hydrocarbon per unit times per unit weight of catalyst in all of the reaction zones combined, often ranges from about 0.5 to about 30, preferably from about 1 to about 15. Preferably, the volume of catalyst in the first reaction zone relative to the volume of catalyst in the last reaction zone ranges from about 1:20 to about 3:1. When the naphthene content of the hydrocarbon feed exceeds about 30% by volume, the volume of catalyst in the first reaction zone relative to the volume of catalyst in the last reaction zone is more preferably from about 1:10 to about 1:1. All of the hydrogen which is added, e.g., recycled back, to the reaction system, e.g., reaction zones, need not be added to the hydrocarbon feed entering the first reaction zone. Thus, it may be advantageous to add only a portion of the cycled hydrogen-rich gas to the hydrocarbon feed entering the first reaction zone while the remainder of this gas is added to one or more of the subsequent reaction zones.

The hydrocarbon feeds useful in the present method comprise benzene precursors, toluene precursors or both. By "precursors" is meant those compounds which can form benzene (or toluene) at the hydrocarbon reforming conditions in one or more of the present reaction zones. Typically, these precursors comprises paraffins, e.g., hexanes, heptanes, and naphthenes, such as, methyl cyclopentane, dimethyl cyclopentane and methyl cyclohexane. Suitable hydrocarbon feeds often comprise a major amount of paraffins and naphthenes. In a preferred embodiment, the hydrocarbon feed useful in the present invention comprises at least about 30% by volume of naphthenes, and more preferably comprises from about 30% to about 65% by volume of naphthenes. Suitable hydrocarbon feeds for use in the present invention include those materials substantially all of which, e.g., at least about 90% by volume, boil below about 260° F. and, preferably, boil above at least about 100° F., and more preferably above at least about 110° F. The boiling points of the present useful feeds, especially the maximum boiling point noted above, clearly distinguish the presently useful feedstocks from, for example, full range naphthas used in gasoline reforming which often have maximum boiling points ranging up to 400° F. or more.

The presently useful hydrocarbon feeds may be derived from any suitable source, e.g., petroleum, shale oil, tar sands, coal and the like. Preferred feeds are derived from fractional distillation of crude petroleum and from various streams obtained during petroleum processing. In some cases, it may be advantageous to use pure hydrocarbons or mixtures of pure hydrocarbons that have been extracted from hydrocarbon distillates, for example, straight-chain paraffins which are to be converted to benzene or toluene. In any event, it is preferred that the hydrocarbon feed by treated by conventional pretreatment methods, if necessary, to remove substantially all sulfurous and nitrogenous contaminants therefrom.

The catalyst or catalysts useful in the present reaction zones may be generally described as platinum group metal-containing catalysts. Thus, any one or more of the Group VIII, platinum group metals may be included in the presently useful catalysts. Although each reaction zone may include a different platinum group metal-containing catalyst, preferably each of the present reaction zones contain catalysts having substantially the same composition. Preferred platinum group metals include platinum, palladium, ruthenium, rhodium, iridium and mixtures thereof, with platinum being especially preferred. The platinum group metal or metals are present in the catalysts in catalytically effective amounts i.e., in amounts sufficient to promote at least one of the desired hydrocarbon reforming reactions. Preferably, the catalyst contain from about 0.01 to about 3.0%, more preferably from about 0.05% to about 1.0%, by weight of at least one platinum group metal.

These catalysts often include a major amount of a support material, such as refractory inorganic oxides, activated clays and the like conventional catalyst support materials. Suitable refractory inorganic oxide support materials include alumina, silica, silica-alumina, magnesia, thoria, titania, boria and mixtures thereof. One particularly preferred support material comprises a major amount of alumina. The preferred alumina component of the catalyst may be gamma-, eta- or theta-alumina or mixtures thereof. The support component, e.g., alumina component, comprises a major proportion, preferably at least about 80%, and still more preferably at least about 90%, by weight of the catalyst. The catalyst may also contain minor amounts, e.g., from about 0.01% to about 5.0% and preferably from about 0.01% to about 3.0% by weight, of at least one additional metal such as rhenium, germanium, gold, tin and the rare earth metals which are conventionally used in reforming catalysts. The metals of the catalyst, e.g., platinum group metals and the additional metals noted above, may be present in any form, e.g., elemental metal, and/or a combined form such as oxides, sulfides and the like, provided that such metal on the catalyst is effective to promote or aid in the promotion of at least one of the desired hydrocarbon reforming reactions or to otherwise improve the properties of the catalyst. The catalyst metal or metals may be incorporated into the catalyst at any convenient time during the preparation of the catalyst and in any conventional and well known manner.

To illustrate, the platinum group component may be incorporated in the catalyst in any suitable manner, such as by coprecipitation or co-gellation with the alumina support, ion exchange with the alumina support and/or alumina hydrogen at any stage in its preparation and either after or before calcination of the alumina hydrogel. A preferred method for adding the platinum group metal to the alumina support involves the utilization of a water soluble compound of the platinum group metal to impregnate the alumina support prior to calcination. For example, platinum may be added to the support by comingling the uncalcined alumina with an aqueous solution of chloroplatinic acid. Other water-soluble compounds of platinum may be employed as impregnation solution including, for example, ammonium chloroplatinate and platinum chloride. It is preferred to impregnate the support with the platinum group metal component when it is in a hydrous state. Following this impregnation, the resulting impregnated support is shaped (e.g., extruded), dried and subjected to a high temperature calcination or oxidation procedure at a temperature in the range from about 700° F. to about 1500° F., preferably from about 850° F. to about 1300° F., for a period of time from about 1 hour to about 20 hours, preferably from about 1 hour to about 5 hours.

The catalyst may, of course, include other components, such as certain halogens and halogenated compounds, aluminosilicates, mixtures thereof and the like which are known to have a beneficial effect on the activity of platinum group metal-containing catalysts. In order to obtain the optimal benefits of the present invention, it is preferred to employ a catalyst or catalysts containing a halogen component, more preferably containing at least about 1.0% by weight of halogen (calculated as elemental halogen).

Although the precise chemistry of the association of the halogen component with the support material, e.g., alumina is not entirely known, it is customary in the art to refer to the halogen component as being combined with the support or with the other ingredients of the catalyst. This combined halogen may be fluorine, chlorine, bromine, and mixtures thereof. Of these, fluorine and, particularly, chlorine are preferred for the purposes of the present invention. The halogen may be added to the support, e.g., alumina, in any suitable manner, either during preparation of the support, or before or after the addition of the catalytically active metallic component or components. For example, at least a portion of the halogen may be added at any stage of the preparation of the alumina support, or to the calcined alumina support, as an aqueous solution of an acid such as hydrogen fluoride, hydrogen chloride, hydrogen bromide and the like or as a substantially anhydrous gaseous stream of these halogen-containing components. Also, the halogen component, or a portion thereof, may be composited with the support, e.g., alumina, during the impregnation of the latter with the platinum group metal component, for example, through the utilization of a mixture of chloroplatinic acid and hydrogen chloride. In another situation, the alumina hydrosol, which is often utilized to form the alumina support, may contain halogen which remains in the final composite. In any event, the halogen may be added in such a manner as to result in a catalyst or catalysts containing from about 0.1% to about 2.0% and preferably from about 1.0% to about 2.0% by weight of halogen calculated on an elemental basis. During processing, i.e., the period during which hydrocarbon is being converted, the halogen content of the catalyst can be, and preferably is, maintained at the desired level by the addition of halogen-containing compounds, such as carbon tetrachloride, ethyl trichloride, t-butyl chloride and the like, to the hydrocarbon charge stock before entering a reaction zone.

The following examples illustrate more clearly the methods of the present invention. However, these illustrations are not to be interpreted as specific limitations on this invention.

EXAMPLES 1 to 4

These examples illustrate one embodiment of the present invention providing for improved benzene production.

A laboratory chemical reaction system comprising an elongated reaction column in which downflowing hydrocarbon is contacted with a catalyst at hydrocarbon reforming conditions was employed. The column was surrounded by heat insulation and the reaction system was equipped with electric heaters so that the temperature at any given point within the column could be maintained as desired.

The reaction column itself was constructed of stainless steel and had an inside diameter of 1.0 inch with a central thermocouple sheath having an outside diameter of 0.25 inch. The column was divided vertically into five (5) reaction zones. Each of these zones contained a portion of the total catalyst. All of the reaction zones were equal in volume. The catalyst in each of these zones was mixed with catalytically inert alumina chips. In descending order, the reaction zones contained 3%, 7%, 15%, 25% and 50%, respectively, of the total catalyst present in the reaction column.

The catalyst employed was a commercially available platinum-rhenium-alumina-containing hydrocarbon reforming catalyst having a generally cylindrical shape with a diameter of about 1/16 inch and a length of about 3/16 inch. This catalyst had the following composition:

| | |
|---|---|
| Platinum, Wt.% | 0.31 |
| Rhenium, Wt.% | 0.40 |
| Chloride, Wt.% | 1.17 |

The feedstock employed in this testing had the following properties:

| ASTM D-86 | °F. |
|---|---|
| IBP | 156 |
| 5 | 169 |
| 10 | 172 |
| 20 | 176 |
| 30 | 178 |
| 40 | 181 |
| 50 | 184 |
| 60 | 190 |
| 70 | 195 |
| 80 | 204 |
| 90 | 216 |
| 95 | 232 |
| EP | 297 |
| Wt.% | |
| Methylcyclopentane | 7.3 |

-continued

| ASTM D-86 | °F. |
|---|---|
| Cyclohexane | 7.6 |
| Benzene | 3.3 |
| Dimethyl cyclopentane | 8.3 |
| Methyl cyclohexane | 10.9 |
| Toluene | 4.1 |

As can be seen from the above, substantially all of this feed-stock, e.g., greater than 90% by volume, boils below about 260° F.

This feedstock was contacted in the reaction system with the above described catalyst in the presence of hydrogen at the following conditions, excluding temperature:

| Pressure | 200 psig. |
|---|---|
| Overall WHSV | 4 |
| Hydrogen to Hydrocarbon Mole Ratio | 7:1 |

Two temperature modes were used during processing. The first temperature mode involved maintaining the reaction zones at essentially constant and uniform temperatures, i.e., isothermal operation. The second temperature mode involved continuously increasing the temperature that the hydrocarbon encountered as it flowed from one reaction zone to another down through the reaction column. In this mode, the inlet temperature to each of the downstream reaction zones was increased about 10°–12° F. relative to the inlet temperature to the immediately preceding reaction zone. Results of this testing were as follows:

|  |  | ISOTHERMAL | ASCENDING |
|---|---|---|---|
| A. | Temperature, °F. | 890 | 870 - Reaction Column Inlet |
|  |  |  | 922 - Reaction Column Outlet |
|  | %Methyl Cyclopentane Conv. | 83 | 83 |
|  | C$_5$+ Yield, Vol.% Based on Hydrocarbon Feedstock | 89.5 | 83.6 |
|  | Net Benzene Yield, Vol. % Based on Hydrocarbon Feedstock | 6.7 | 9.2 |
|  | Net Toluene Yield Vol.% Based on Hydrocarbon Feedstock | 18.8 | 18.7 |
| B. | Temperature, °F. | 948 | 910 - Reacton Column Inlet |
|  |  |  | 960 - Reaction Column Outlet |
|  | %Methyl Cyclopentane Conv. | 93 | 93 |
|  | C$_5$+ Yield, Vol. % Based on Hydrocarbon Feedstock | 78.2 | 79.7 |
|  | Net Benzene Yield, Vol.% Based on Hydrocarbon Feedstock | 10.45 | 11.0 |
|  | Net Toluene Yield, Vol.% Based on Hydrocarbon Feedstock | 21.4 | 19.8 |

These results clearly demonstrate that the present process which involves providing increasing reaction zone inlet temperatures results in improved yields of benzene product relative to the benzene yields obtained in a reforming operation in which the inlet temperature of each of the reaction zones is substantially equal. This result is particularly surprising since the yield of C$_5$+ product obtained at isothermal conditions is substantially equal to or greater than the C$_5$+ yield obtained using ascending inlet temperatures.

EXAMPLES 5 to 9

These examples illustrate an additional feature of the present invention providing improved yields of benzene product.

A laboratory chemical reaction system similar to that used in Examples 1 to 4 was loaded with a commercially available platinum-alumina-containing hydrocarbon reforming catalyst having the following composition:

| Platinum, Wt. % | .544 |
|---|---|
| Chloride, Wt. % | 1.0 |

The feedstock used to contact this catalyst had substantially the same composition as the feedstock employed in Examples 1 to 4. Other reaction conditions included:

| Pressure | 250 psig. |
|---|---|
| H$_2$/H'C Mole Ratio | 7 |
| Overall WHSV | 3.8 |

The average temperature within the reaction zone was varied between about 920° F. and about 960° F. to vary the degree of conversion. In certain of these tests, as indicated below, methanol (which decomposes to form water at reaction conditions) was added to the hydrocarbon feedstock entering the reaction zone to provide the desired partial pressure of water.

Several tests were run at various methylcyclopentane conversion levels and at two reaction zone water partial pressure levels. Results of these tests are summarized below:

| EXAMPLE | 5 | 6 | 7 | 8 | 9 |
|---|---|---|---|---|---|
| Reaction Zone Water Partial Pressure, mm.Hg. | ~0.01 | | | 0.2 - 0.7 | |
| Methylcyclopentane Conversion, % | 89 | 94 | 82 | 89 | 91.5 |
| Net Benzene Yield, Vol.% Based on Hydrocarbon Feedstock | 8.7 | 11.0 | 8.7 | 9.7 | 11.0 |
| Net Toluene Yield, Vol.% Based on Hydrocarbon Feedstock | 19.3 | 19.3 | 16.5 | 17.8 | 18.5 |
| Total C$_5$+ Yield, Wt.% of Hydrocarbon Feedstock | 87 | 79 | 90 | 86 | 84 |

These results clearly demonstrate that improved yields of benzene can be obtained by contacting the feedstock with catalyst in the presence of a limited amount of water. For example, comparing Examples 5 and 8 indicates that a substantial increase in benzene yield is obtained using "wet" operation relative to "dry" operation even though both Examples involve similar methylcyclopentane conversions.

EXAMPLES 10 to 12

These examples illustrate a further feature of the present invention providing for improved yields of toluene product.

The reaction system, catalyst, feedstock and reaction conditions employed in this series of tests were similar to those used in Examples 5 to 9. Tests were run at various dimethylcyclopentane conversion levels and at two reaction zone water partial pressure levels. Results of these tests are as follows:

| EXAMPLE | 10 | 11 | 12 |
|---|---|---|---|
| Reaction Zone Water Partial Pressure, mm.Hg. | ~0.01 | 0.2 - 0.7 | |
| Dimethylcyclopentane Conversion, % | 96–99 | 95 | 98 |
| Toluene Yield, Vol.% of C$_5$+ Product | 19.3 | 16.2 | 18.1 |
| Total Yield, Wt.% of Feedstock | 87–79 | 91 | 80 |

Thus, toluene production is favored by dry hydrocarbon reforming operation. This is particularly surprising since the production of benzene, as shown previously, is favored when wet operation is employed. In commercial practice, substantially anhydrous operating conditions can be achieved in any conventional manner. For example, in-line driers may be employed to dry the hydrocarbon feedstock and/or hydrogen streams. Also, distillation may be used to render the hydrobcarbon feedstock substantially anhydrous.

Clearly, the present invention provides improved methods for producing benzene product, toluene product or both. The utilization of increasing reaction zone inlet temperatures and a "wet" reaction zone environment provide for improved benzene yields. Improved toluene yields are achieved by operating the hydrocarbon reforming reaction zone or zones at "dry" conditions.

While this invention has been described with respect to various specific examples and embodiments, it is to be understood that the invention is not limited thereto and that it can be variously practices within the scope of the following claims.

The embodiments of the invention in which an exclusive property or privilege is claimed are defined as follows:

1. A method of producing a benzene product, or a benzene product and a toluene product by reforming a hydrocarbon feed comprising benzene precursors, or benzene precursors and toluene precursors in the presence of free molecular hydrogen and a platinum group metal-containing catalyst and employing in series a plurality of reaction zones, said benzene precursors include methylcyclopentane, said feed having a naphthene content of at least about 30% by volume and substantially all of said feed boiling below about 260° F.; recovering a liquid product from said reforming and separating said liquid product to form a benzene product or a benzene product and a toluene product; the improvement which comprises contacting said hydrocarbon feed in a first reaction zone at hydrocarbon reforming conditions in the presence of free molecular hydrogen and said platinum-containing catalyst to form an effluent, and contacting said effluent in at least one subsequent reaction zone at hydrocarbon reforming conditions in the presence of free molecular hydrogen and said platinum-containing catalyst thereby converting at least a portion of said methylcyclopentane to benzene, and provided that the inlet temperature of each succeeding reaction zone is increased over the inlet temperature of the preceding reactor zone, and further provided that the volume yield of said liquid product is substantially the same as or is reduced and the volume yield of benzene product is increased relative to said reforming at substantially equal methylcyclopentane conversion in which the inlet temperatures of each of the reaction zones are substantially equal.

2. The method of claim 1 wherein the inlet temperature of said first reaction zone is from about 25° F. to about 100° F. less than the outlet temperature of said last reaction zone.

3. The method of claim 2 wherein the difference in inlet temperatures between any two consecutive reaction zones is at least about 10° F.

4. The method of claim 3 wherein the inlet temperature of said first reaction zone is at least about 780° F. and the inlet temperature of said last reaction zone is at least about 900° F.

5. The method of claim 4 wherein said reforming conditions include pressures in the range from about 100 psi. to about 1000 psi.; hydrogen to hydrocarbon mole ratios in the range from about 2 to about 30; and an overall WHSV in the range from about 0.5 to about 30.

6. The method of claim 5 wherein said platinum group metal is platinum and said catalyst further includes a halogen component.

7. The method of claim 6 wherein said catalyst contains from about 0.01% to about 3.0% by weight of platinum (calculated as elemental platinum) and from about 0.1% to about 2.0% by weight of chlorine (calculated as elemental chlorine).

8. The method of claim 7 wherein the inlet temperature of said first reaction zone is in the range from about 800° F. to about 920° F. and the inlet temperature of said last reaction zone is in the range from about 900° F. to about 1000° F.

9. The method of claim 2 wherein the water vapor partial pressure in at least one of said reaction zones is at least about 0.02 mm.Hg. thereby providing an increased yield of benzene product.

10. The method of claim 9 wherein the water vapor partial pressure in all of said reaction zones is in the range from about 0.10 mm.Hg. to about 3.0 mm.Hg.

11. The method of claim 2 wherein said feedstock includes dimethylcyclopentane and the water vapor partial pressure in at least one of said reaction zones is less than about 0.1 mm.Hg. thereby providing an increased yield of toluene product.

12. The method of claim 11 wherein the water vapor partial pressure in all of said reaction zones is less than about 0.02 mm.Hg.

* * * * *